US008929932B1

(12) United States Patent  
Lan et al.

(10) Patent No.: US 8,929,932 B1  
(45) Date of Patent: *Jan. 6, 2015

(54) METHODS FOR USER-INTERFACE OVER SMS MESSAGES BASED ON A REUSABLE STREAM MODEL

(75) Inventors: Divon Lan, Tel Aviv-Yafo (IL); Natalia Marmasse, Ichud (IL); Mark Grossmann, Rishon Lezion (IL); Shai Gutner, Modi'in (IL); Michal Maor, Mazor (IL); Dror Marcus, Tel Aviv-Yafo (IL); Tal Franji, Hod Hasharon (IL)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/615,248

(22) Filed: Sep. 13, 2012

Related U.S. Application Data

(62) Division of application No. 13/152,215, filed on Jun. 2, 2011, now Pat. No. 8,290,521.

(51) Int. Cl.  
*H04W 4/00* (2009.01)

(52) U.S. Cl.  
USPC ..... 455/466; 455/414.1; 455/411; 455/412.2; 370/351; 370/388

(58) Field of Classification Search  
None  
See application file for complete search history.

(56) References Cited

U.S. PATENT DOCUMENTS

| | | | |
|---|---|---|---|
| 2004/0008656 A1* | 1/2004 | Qu et al. | 370/342 |
| 2006/0143126 A1* | 6/2006 | Vasishth et al. | 705/51 |
| 2008/0188207 A1 | 8/2008 | Lee | |
| 2008/0254815 A1 | 10/2008 | Murphy et al. | |
| 2009/0036149 A1 | 2/2009 | Liu et al. | |
| 2009/0197579 A1 | 8/2009 | Celik | |
| 2010/0279716 A1 | 11/2010 | Benco et al. | |
| 2011/0188426 A1* | 8/2011 | Song et al. | 370/311 |
| 2013/0005365 A1* | 1/2013 | Bailey et al. | 455/466 |

OTHER PUBLICATIONS

Example of Applications of SMS Messaging, Sep. 2011, retrieved from <http://www.developershome.com/sms/sms_tutorial.asp?page=egApps>.  
Nexsites Interactive SMS, nexmedia, Sep. 2011, retrieved from <http://nexmedia.com.sg/nexsites-components/nexsites-interactive-sms.html>.  
Mobile/SMS Solutions, Smash, Sep. 2011, retrieved from <http://www.smashcode.com/solutions>.

(Continued)

*Primary Examiner* — Rafael Pérez-Gutiérrez  
*Assistant Examiner* — Keith Fang  
(74) *Attorney, Agent, or Firm* — Shumaker & Sieffert, P.A.

(57) ABSTRACT

Configurations providing a reusable stream model for a user interface over SMS for interacting with one or more interactive systems in a parallel manner are described. An SMS server can implement the reusable stream model in which an available number from a sequence of numbers (e.g., a block of numbers) is assigned to a user session upon receiving an SMS message to initiate the user session from a communication device. The user session corresponds with a message stream for the interactive system. In one aspect, the SMS server places each number from the sequence of numbers in a respective status to indicate whether the number is currently assigned to a user session. When a subsequent SMS message is received that requests to initiate an additional user session for another interactive system, the SMS can assign the next available number from the sequence to the additional user session.

11 Claims, 7 Drawing Sheets

(56) References Cited

OTHER PUBLICATIONS

Uses, Smash, Sep. 2011, retrieved from <http://www.smashcode.com/products/uses>.

The Mobile Application Server, Smash, Apr. 2009, retrieved from <http://www.smashcode.com/node/117>.

Schedule Summary for the Hands-on Labs, BOFs, and Sessions, JavaOne, Jun. 2009, retrieved from <http://java.sun.com/javaone/sf/2008/schedule_detail.jsp>.

TS-5584 Building Interactive Mobile Messaging (Short Message Service) Applications, Technical Session, Michael Juntao Yuan, eZee Inc., May 9, 2008, Moscone Center—Hall E 133.

* cited by examiner

Stage 410

Stage 420

Stage 430

Stage 440

METHODS FOR USER-INTERFACE OVER SMS MESSAGES BASED ON A REUSABLE STREAM MODEL

REFERENCE TO RELATED APPLICATIONS

This application is a divisional application of U.S. patent application Ser. No. 13/152,215, filed on Jun. 2, 2011, the entire disclosure of which is hereby incorporated by reference in its entirety.

BACKGROUND

In particular geographical areas in which wireless Internet/broadband infrastructure is not prevalent or insufficient, a Short Message Service (SMS) can be utilized to enable communication via wireless mobile devices. However, current SMS implementations impose limited functionality for accessing different levels of an interactive system because of inherent limitations with SMS. Some implementations may require users to remember complex and non-intuitive command line syntax in order to communicate over SMS. Additionally, because of the stateless nature of SMS, tracking the context in which a respective SMS message is interacting with the system is problematic because the user may switch between different commands/options in the system.

Moreover, the delivery of an SMS message is not guaranteed, let alone, to be delivered according to an expected order or sequence. Therefore, SMS implementations may result in delayed or lost SMS delivery that introduces problems in providing interactive user interfaces.

SUMMARY

The subject technology provides for receiving a first SMS message from a user to initiate a first user session. The first user session corresponds with a first message stream associated with a first interactive system. A first available phone number is assigned to the first user session among a sequence of phone numbers in which each of the phone numbers is in a respective status. The status of the first available phone number is changed to a busy status. A second SMS message is received from the user to initiate a second user session. The second user session corresponds with a second message stream associated with a second interactive system. A second available phone number is assigned among the sequence of phone numbers to the second user session. The status of the second phone number is changed to a busy status.

Another aspect of the subject technology provides, for a first phone number assigned to a first user session, determining whether the first phone number is inactive during a first period of time. The status of the first phone number is changed from a busy status to a stale status if the first phone number is inactive during the first period of time. The status of the first phone number is changed from the stale status to a free status after a second period of time has elapsed.

In another aspect, the subject technology provides a system for providing a user-interface over a Short Message Service (SMS) to enable functionality in an interactive system. The system includes an SMS front-end server configured to provide one or more modules to perform different functionality. In one aspect, the SMS front-end server includes a session module configured to assign a first available number from a sequence of phone numbers to a first user session and to assign a second available number from the sequence of phone numbers to a second user session. The SMS front-end server includes a reception module configured to receive one or more SMS messages from a communication device for interacting with the first and second user sessions. Further, the SMS front-end server includes a transmission module to transmit one or more SMS messages to the communication device responsive to the received SMS messages.

In yet another aspect, the subject technology provides for receiving a first SMS message from a communication device to initiate a first user session in which the first user session corresponds with a first message stream associated with a first interactive system. A first phone number in a free status is assigned to the first user session among a sequence of phone numbers in which each of the phone numbers is in a respective status. The status of the first phone number is changed to a busy status. A second SMS message is received from the communication device to initiate a second user session in which the second user session corresponds with a second message stream associated with a second interactive system. A second phone number in a free status is assigned among the sequence of phone numbers to the second user session. The status of the second phone number is changed to a busy status.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The novel features of the subject technology are set forth in the appended claims. However, for purpose of explanation, several configurations of the subject technology are set forth in the following figures.

DETAILED DESCRIPTION

Figure 1:
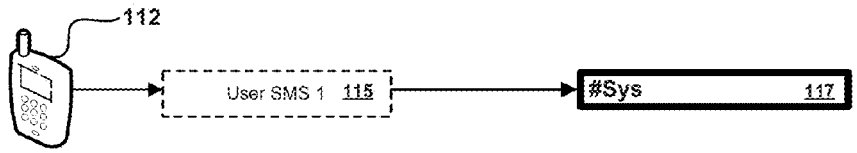
FIG. 1 conceptually illustrates a communication flow between a communication device and an SMS server utilizing a reusable stream model.
Figure 1:
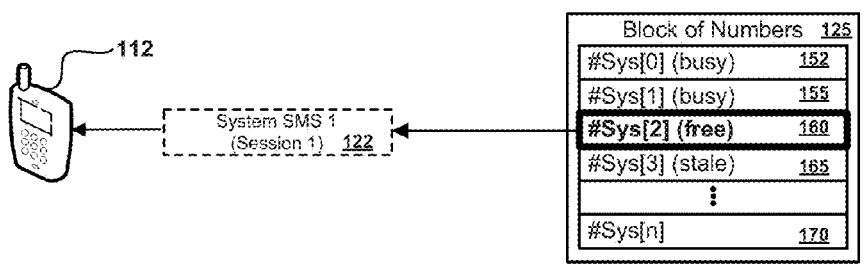
Figure 1:
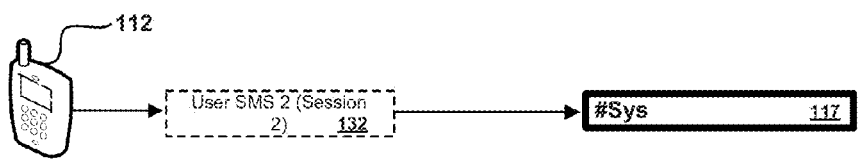
Figure 1:
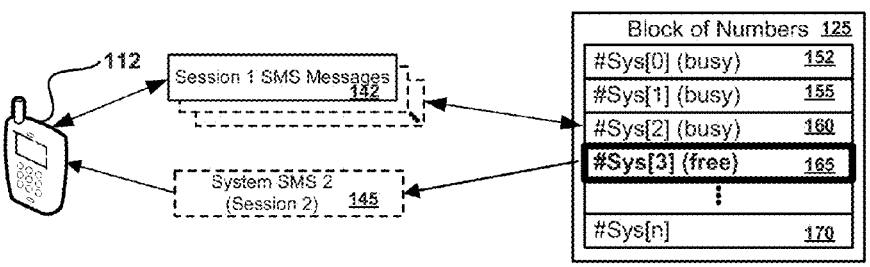
Figure 1:
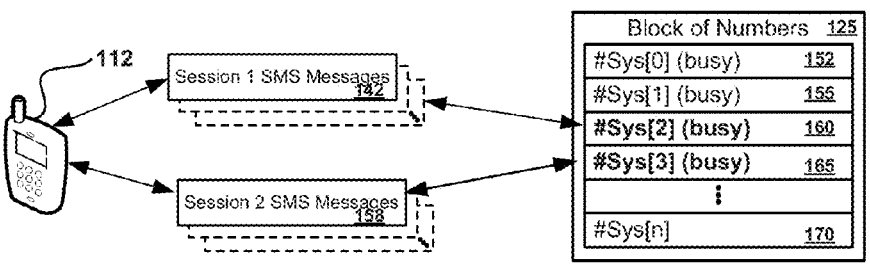

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

In particular geographical areas in which wireless telecommunications infrastructure is not prevalent or wireless voice connectivity is low, a Short Message Service (SMS) can be utilized to enable communication via wireless mobile devices. However, current SMS implementations impose limited functionality for accessing different levels of an interactive system because of inherent limitations with SMS. Some implementations may require users to remember complex and non-intuitive command line syntax in order to communicate over SMS. Additionally, because of the stateless nature of SMS, tracking the context in which a respective SMS message is interacting with the system is problematic because the user may switch between different commands/options in the system.

To enable functionality to perform more complex tasks with an interactive system, a method for providing a user-interface for an interactive system using SMS based on a reusable stream model is described. In some implementations, the method uses a block of phone numbers to send and receive SMS messages to an SMS server for allowing complex user interactions such as menu-trees, list browsing and drill-down interaction over several menu/list levels.

In a reusable stream model, a user can interact with one or more interactive systems via one or more corresponding message streams (e.g., e-mail threads, activity-streams, group chat, blogs, etc.) in a parallel manner. As used herein, the expression "message stream" represents an exchange of one or more SMS messages between a user's communication device and the SMS server. A message stream therefore corresponds with a user session assigned to a phone number for an interactive system. A respective phone number from the block of phone numbers can be assigned to handle a particular message stream for an associated interactive system.

In some implementations, each phone number from the block of phone numbers can be in one of three different states: free, busy or stale. The SMS server can set the phone number to a particular status based on whether the phone number is currently handling a message stream (e.g., free or busy). After a period of time with no activity on a particular phone number assigned to a corresponding message stream, the SMS server can place the phone number in a stale status from a busy status to indicate a timeout for activity.

The user can first send an SMS message to an SMS server to initiate a first user session corresponding with a first message stream for a particular interactive system. The SMS server can determine a first available phone number to assign to the first message stream. The SMS server then places the assigned phone number in a busy status to indicate its assignment to the first message stream. The user can subsequently transmit and receive one or more SMS messages to/from the SMS server over the assigned phone number in order to interact with the first message stream for the associated interactive system.

To initiate a second session for a second message stream associated with a second interactive system, the user can repeat similar operations as described above for establishing the first session corresponding to the first message stream. For instance, the SMS server can assign a second available phone number for the second message stream in which the user can send and receive SMS messages to interact with the second interactive system.

The following description describes the interaction between a user's communication device and the aforementioned SMS server. The SMS server can provide a user interface over SMS based on a reusable stream model in which more than one user session can be provided from a sequence of phone numbers by the SMS server. In this manner, the user can interact with more than one interactive service in parallel over the user interface over SMS.

FIG. 1 conceptually illustrates a communication flow between a communication device and an SMS server utilizing a reusable stream model. More specifically, FIG. 1 illustrates the communication flow in different stages 110-150 between a communication device 112 and an SMS server for providing an interactive user interface over SMS. As used herein, a communication device can include, but is not limited to, a mobile device, handheld device, a personal digital assistant, a cellular phone, smartphone, tablet computer, laptop, etc.

In the first stage 110, the communication device 112 transmits an SMS message 115 to the SMS server represented by a system number 117. As shown, the system number 117 is represented as a single "short code" number "#Sys" that the communication device can use to transmit the SMS message 115 to initiate a user session with the SMS server. By way of example, the SMS message 115 can include a command to access a service via the SMS server, such as mail, chat, social networking, blogging, etc. Each service can represent an interactive system that provides a complex set of commands and menus (e.g., one or more different levels of menus that provide access to other commands) that are not easily provided based on the limitations of SMS.

In the second stage 120, the SMS server manages a block of numbers 125 which is used to implement the reusable stream model for providing a user interface over SMS. As illustrated, the block of numbers 125 includes a sequence of phone numbers 152-170. In some configurations, the SMS server utilizes an index (e.g., 0 to n where 0 represents the first number and n is the last number) to access a particular phone number in the sequence of phone numbers. The SMS server can place each number from the sequence of phone numbers 152-170 in a respective status to indicate whether the corresponding phone number is currently assigned to a user session. By way of example, each phone number can be assigned in a free, busy, or stale status. In some configurations, an available number is in a free status (i.e., currently not assigned to a user session), a busy number is currently assigned to a corresponding user session, and a stale number indicates that the number is inactive (i.e., assigned to a user session but no activity).

After receiving the SMS message 115 from the first stage 110, the SMS server assigns a first available phone number to a user session corresponding to the interactive system accessed by the command from the SMS message 115. The first available number can be a phone number currently in a free status. In some configurations, the SMS server can iterate or scan through the block of numbers 125 to determine a first number in a free status to assign to the user session. As shown in FIG. 1, the SMS server assigns a phone number 160 (as indicated by #Sys[2] in bold) that is currently in a free status from the block of numbers 125 to the user session. The assigned phone number 160 therefore corresponds with a message stream associated with a first interactive system. The SMS server then transmits an SMS message 122 over the phone number 160 in response to the SMS message 115 from the first stage 110.

In some configurations, the SMS message 122 includes a set of options corresponding to a level within the interactive system. As used herein, a level can be understood as a menu level within a user interface. For a given command included in the SMS message from the communication device 112, the SMS server can provide a set of options responsive to that command. In an example in which the initial SMS message from the communication device 112 includes a command for accessing a mail service, the SMS server can transmit a subsequent SMS message including one or more options for the mail service (e.g., send mail, browse mail, browse contacts, etc.) to the communication device 112.

In the third stage 130, the communication device 112 transmits an SMS message 132 to the SMS server represented by the system number 117 to initiate a second user session. In the reusable stream model, the SMS server can manage multiple user sessions to different interactive systems to enable the communication device (i.e., the user) to interact with multiple interactive systems in parallel. Similar to the SMS message 115 from the first stage 110, the SMS message 132 can include a command to access a second service via the SMS server, (e.g., mail, chat, social networking, blogging, etc.). For example, the communication device 112 can transmit a command to access a second interactive system.

In the fourth stage 140, the SMS server assigns an available phone number from the block of numbers 125 to a second user session corresponding to the second interactive system accessed by the command in the SMS message 132 from the third stage 130. For instance, the SMS server can determine an available phone number from the block of numbers 125 and then select the available number to assign to the second user session. As shown, the SMS server assigns a phone number 165 that is designated by an index value of 3 (i.e., Sys[3]), which is a currently available phone number. The SMS server then transmits an SMS message 145 over the phone number 165 in response to the SMS message 132 from the third stage 130. In some configurations, the SMS message 145 includes a set of options corresponding to a level within the second interactive system.

As further shown in the fourth stage 140, the phone number 160 is currently in a busy status as this number was assigned to the first user session from the second stage 120. The SMS server can receive and transmit one or more SMS messages 142 over the phone number 160 assigned to the first user session corresponding to the first message stream. In this manner, the SMS server can enable the communication device (i.e., the user) to interact with different interactive systems over SMS in a parallel manner.

In the reusable stream model, the SMS server can receive and transmit other SMS messages for other user sessions corresponding to different message streams in a parallel manner. As shown in the fifth stage 150, the SMS server can receive and transmit one or more different SMS messages 142 and 158 respectively over the phone numbers 160 and 165 assigned to the first and second user sessions. The phone number 165 is further shown as in a busy status after being assigned to the second user session corresponding to the second message stream from the fourth stage 140.

By way of example, in the fifth stage 150, a first subsequent SMS message can be received over the phone number 160 and a second subsequent SMS message can be received over the phone number 165 from the communication device 112 in which the first and second subsequent SMS messages can each include a selected option from the corresponding first and second interactive systems. The SMS server can transmit a respective message to the first and second interactive systems for executing a corresponding command from the first and second interactive systems (e.g., based on the selected options from the first and second subsequent SMS messages). The SMS server can manage multiple message streams by then transmitting response SMS messages from the first and second interactive systems over the phone numbers 160 and 165 to the communication device 112. In some configurations, the SMS server can transmit the response messages in parallel over the phone numbers 160 and 165.

Although the above description of FIG. 1 relates to two different message streams corresponding to the phone numbers 160 and 165, one of ordinary skill in the art would appreciate that the SMS server could provide additional message streams by assigning other available phone numbers to different user sessions corresponding to more interactive systems. Additionally, although FIG. 1 illustrates a single block of numbers 125, the SMS server can manage additional blocks of numbers not shown in FIG. 1. Therefore, it should be understood that the SMS server can implement the reusable stream model described above by utilizing several sequences of phone numbers provided in additional blocks of numbers.

Figure 2:
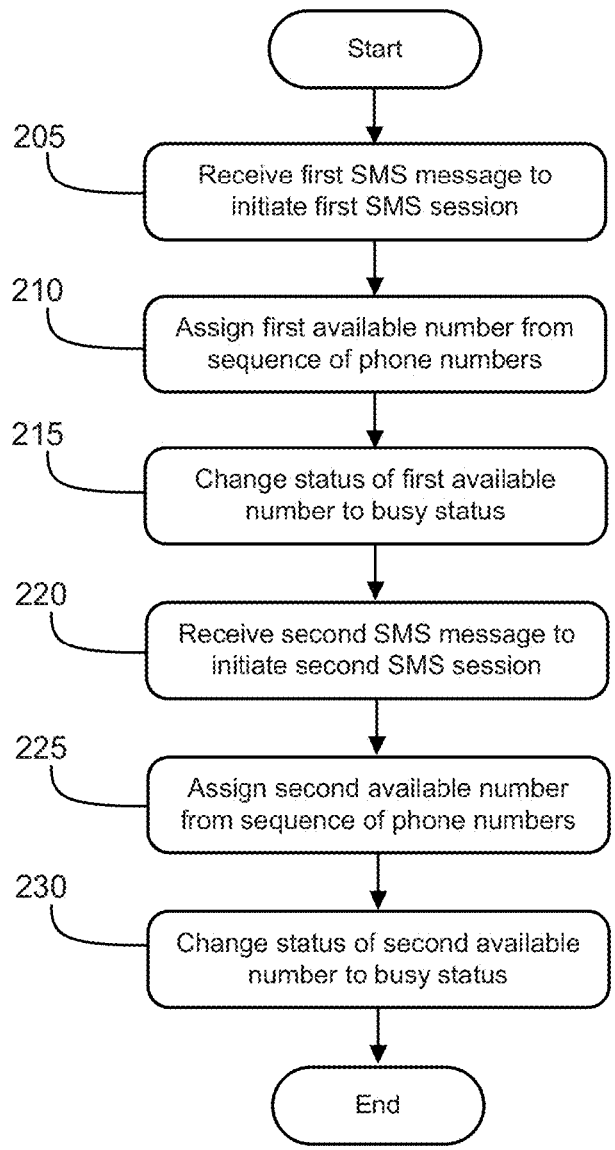
FIG. 2 conceptually illustrates an exemplary process for implementing a reusable stream model for providing a user interface over SMS.

The following discussion describes an exemplary process for implementing the reusable stream model for providing a user interface over SMS as described above. The aforementioned SMS server of some configurations can implement such a process described in further detail below. FIG. 2 conceptually illustrates an exemplary process 200 for implementing a reusable stream model for providing a user interface over SMS. FIG. 2 will be described below by reference to relevant portions of FIG. 1.

The process 200 begins when a first SMS message is received at 205 to initiate an SMS session. Referring to FIG. 1, the communication device 112 transmits the SMS message 115 to initiate the SMS session that is received by the SMS server (represented by the system number 117). In some configurations, the SMS server receives the first SMS message over a system number as shown in the first stage 110 of FIG. 1. The system number of some configurations can be an access number (e.g., a sequence of digits) in which the communication device (i.e., the user) can transmit the first SMS message to access one of the services provided over SMS by the SMS server. By way of example, the process 200 can receive the first SMS message that includes a text string corresponding to a command (e.g., mail, chat, blog, etc.) that activates a particular service.

At 210, the process 200 assigns a first available number from a sequence of phone numbers in response to the first SMS message to initiate the user session. In the reusable stream model, the SMS server of some configurations can set each number in a particular status depending on whether the number is currently assigned to a corresponding message stream. The SMS server at 210 can then determine a first available phone number (i.e., a number in a free status) from the sequence of numbers managed by the SMS server. By reference to FIG. 1, the SMS server assigns the phone number 160 (i.e., #Sys[2]) to the SMS session from the block of numbers 125 in the second stage 120.

After assigning the available phone number, the process 200 at 215 then changes the status of the assigned available number from the sequence of numbers from a free status to a busy status. Referring to FIG. 1, the SMS server changes the status of the phone number 160 from a free status in the second stage 120 to a busy status in the fourth stage 140. A phone number in a busy status is not available for assigning to a subsequent user session.

The process 200 at 220 receives a second SMS message to initiate a second SMS session. In the reusable stream model, the process 200 can assign an additional user session to a phone number that is available (i.e., not currently assigned to an existing user session). Given that the first phone number from 215 is now unavailable (i.e., in the busy status), the process 200 at 225 assigns a second available number from the sequence of phone numbers. Referring to FIG. 1, the SMS server assigns the phone number 165 in the fourth stage 140 to the second SMS session initiated by the SMS message 132 from the third stage 130.

At 230, the process 200 changes the status of the assigned second phone number from 225 to a busy status. The second phone number is now unavailable for assignment to a subsequent user session. The process then ends. By reference to FIG. 1, the SMS server changes the status of the phone number 165 from a free status in the fourth stage 140 to a busy status in the fifth stage 150.

Although the process 200 described above assigns two different available phone numbers to the first and second user sessions, one of ordinary skill in the art would realize that the process could assign additional phone numbers from the sequence of phone numbers to additional user sessions as subsequent SMS messages to initiate the additional user sessions are received. In such an instance, the process 200 can repeat similar operations to steps 205-215 to assign a respective phone number from the sequence of phone numbers to an additional user session. In this manner, the process 200 provides multiple user sessions for interacting with corresponding interactive systems in a parallel manner.

As mentioned above, the SMS server can change the status of a phone number from a free status to a busy status after assigning the phone number to a user session. Given that the sequence of phone numbers is a finite block of numbers, the SMS server can be configured to monitor activity on each assigned phone number (i.e., currently in a busy status) in order to release one or more numbers into a pool of available numbers for assigning to additional user sessions. In particular, an assigned number in some instances may not have sufficient activity to remain assigned to the user session. The SMS server therefore can be configured to momentarily change the status of the assigned number from a busy status to a stale status to indicate that the user session corresponding to the assigned number has expired (i.e., due to insufficient activity).

Figure 3:
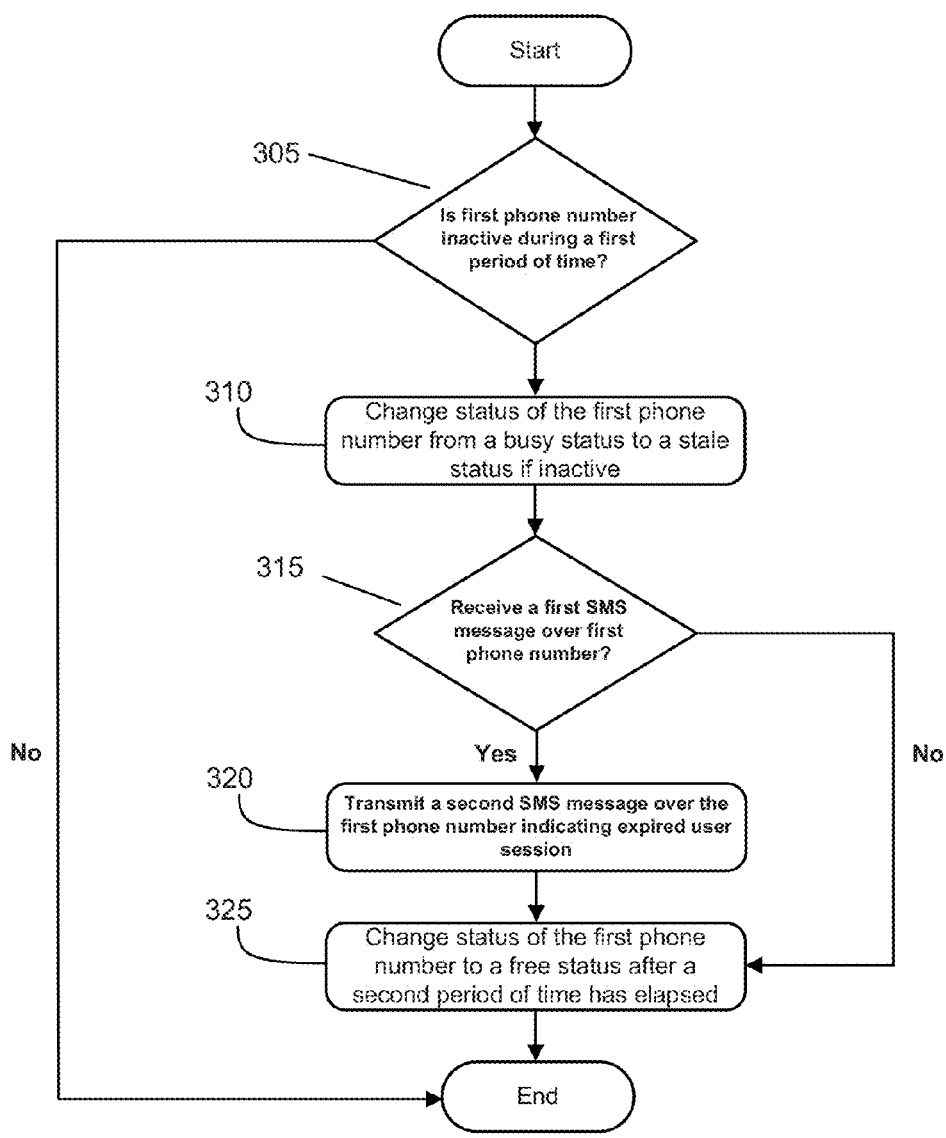
FIG. 3 conceptually illustrates an exemplary process for changing a status of an inactive phone number assigned to a user session to a stale status and notifying a user when the phone number is stale.

The following discussion describes an exemplary process for determining whether an assigned phone number to a user session is inactive and to notify a user that the user session is now considered to have expired due to inactivity. The SMS server of some configurations can implement such a process described in further detail below. FIG. 3 conceptually illustrates an exemplary process 300 for changing a status of an inactive phone number assigned to a user session to a stale status and notifying a user when the phone number is stale.

The process 300 begins at 305 to determine, for a first phone number assigned to first user session, whether the first phone number is inactive during a first period of time. In some configurations, the first period of time is an adjustable time period. By way of example, the first period of time can be adjusted based on an administrator setting or parameter (e.g., a session timeout setting as set via an administrator tool). In another aspect, the first period of time can be determined based on an average session time. The average session time, for example, can be determined by tracking the respective session times for several sessions and averaging the session times.

Inactivity in the context of the first user session can be determined based on not receiving or transmitting at least one SMS message from a communication device or the SMS server during the first period of time. The process 300 in some configurations can monitor the activity over the first phone number by tracking incoming and outgoing data traffic of SMS messages. The process can consider the assigned first phone number as inactive after the first period time has elapsed and no SMS message is sent or received over the first phone number. Alternatively, if the process 300 determines that the first phone number is not inactive active) during the first period of time, then the process 300 ends.

The process 300 continues to 310 to change the status of the first phone number from a busy status to a state status if the process 300 determines that the first phone number is inactive at 305. In some configurations, the process 300 transmits an SMS message to the communication device to notify the user that the first phone number is currently state. Upon being placed into the stale status, the first phone number is not available for assigning to another user nor is the first number available for receiving an SMS message from the communication device. In the reusable stream model, an SMS server will not assign a user session to any number in a state status from a sequence of phone numbers. Additionally, the SMS server wilt not process any SMS message transmitted over any number in a stale status.

At 315, the process 300 makes a determination whether a first SMS message is received over the first phone number. In some configurations, the process 300 can make this determination at 315 during a second period of time. The second period of time can be adjusted utilizing any of the aforementioned techniques discussed in connection with the first time period. The process 300 continues to 325 if no SMS message is received over the first phone number. Alternatively, the process 300 continues to 320 if the process 300 determines at 315 that an SMS message is received over the first phone number. In the reusable stream model, the SMS server of some configurations will not process any received SMS message because the first phone number is now in a state status. The user session therefore is considered invalid or expired. The process 300 can then notify the user of the expired user session by transmitting an SMS message over first phone number to the user. At 320, the process 300 transmits a second SMS notifying the user of the expired user session.

Given that the sequence of phone numbers is a finite block of numbers (i.e., a limited resource), the SMS server can release numbers that have been set in a stale status for assigning to other user sessions. In some configurations, the SMS server can wait for a second period of time before making the number available for assigning to a user session. After the second period of time has elapsed, the process 300 at 325 changes the status of the first phone number from the stale status to a free states.

Although FIG. 3 illustrates that the second SMS message indicating the expired user session is transmitted at 320 after receiving the first SMS message, the process 300 can transmit an SMS message indicating the expired user session irrespective of receiving the first SMS message. In other words, the process 300 in some configurations can transmit an SMS message indicating the expired user session after changing the status of the first phone number front a busy status to a stale status at 310.

The following discussion relates to a communication flow between the SMS server and the communication device for aspects of FIG. 3 described above. More specifically, the SMS server can release an inactive assigned number to a user session and notify a user (i.e., a communication device) that the user session has expired.

Figure 4:
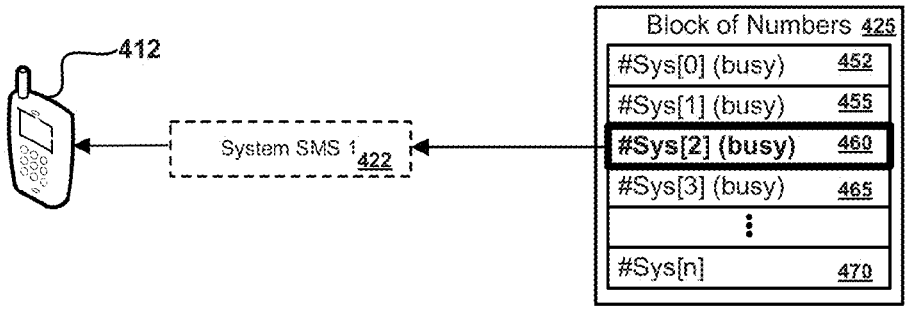
FIG. 4 conceptually illustrates an exemplary communication flow between the SMS server and a communication device (i.e., user) for releasing an assigned number from a block of phone numbers after a user session has expired from inactivity.
Figure 4:
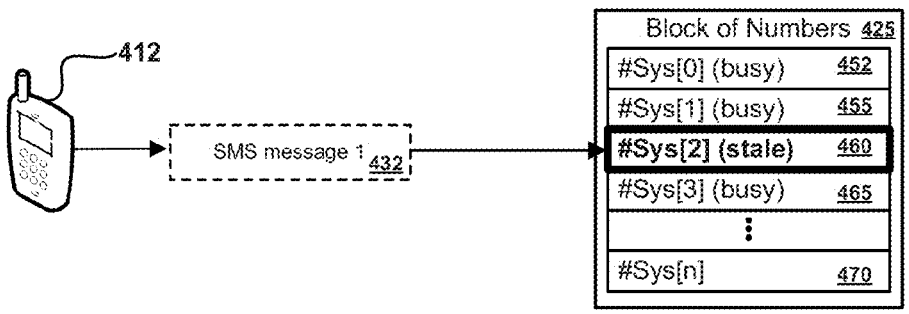
Figure 4:
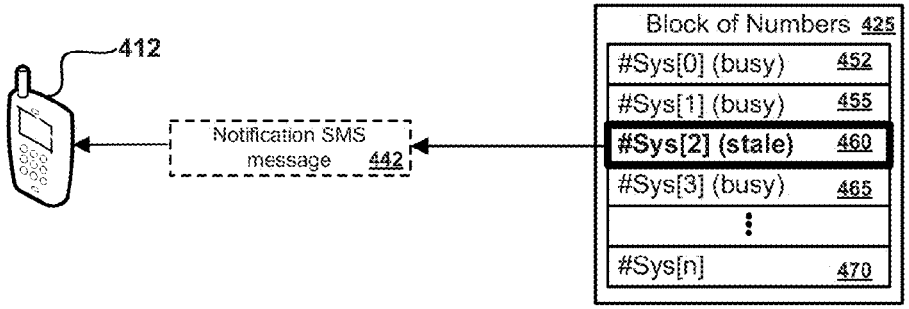
Figure 4:

FIG. 4 conceptually illustrates an exemplary communication flow between the SMS server and a communication device (i.e., user) for releasing an assigned number from a block of phone numbers after a user session has expired from inactivity. FIG. 4 will be discussed with reference to portions of FIG. 3.

As shown, FIG. 4 illustrates a communication flow in four stages 410-440 between a communication device 412 and an SMS server managing a block of numbers 425, which includes first to nth phone numbers 452-470. The SMS server manages the block of numbers 425 in order to provide a user interface over SMS based on the reusable stream model.

In the first stage 410, the SMS server transmits a SMS message 422 over a phone number 460 assigned to a first user session (as illustrated in bold) to the a communication device 412. As shown, the assigned phone number 460 is currently in a busy status. In some configurations, the SMS server transmits the SMS message 422 after receiving a previous SMS message from the communication device 412. For instance, the communication device 412 can transmit the previous SMS message to initiate the user session (e.g., by transmitting the SMS message over the system number) and the SMS server can assign a first available phone number (i.e., in a free status) to the user session. In response to a command or selected option included in the previous SMS message, the SMS server can transmit the SMS message 422 over the assigned phone number 460 to the communication device 412.

In the second stage 420, the SMS server changes the status of the assigned phone number 460 to a stale status after a first period of time has elapsed in which no activity occurs over the phone number 460. The SMS server of some configurations can monitor activity over the phone number 460 by tracking the transmission and reception of data (i.e., one or more SMS messages). If the SMS server does not detect any activity over the phone number 460 during the first period of time, the SMS server changes the status of the phone number 460 to a stale status as shown in the second stage 420. The user session assigned to the phone number 460 is considered expired (i.e., invalid) and therefore the SMS server will not process a received SMS message. Referring to FIG. 3, the process 300 at 305 determines whether the first phone number is inactive during the first period of time and changes the status of the first phone number to the busy status at 310.

As further shown in the second stage 420, the communication device 412 transmits an SMS message 432 over the phone number 460 when the first phone number is in the stale status. Referring back to FIG. 3, the process 300 at 315 determines whether an SMS message is received over the first phone number after changing the status of the first phone number to the stales status at 310.

In response to the SMS message 432 from the second stage 420, the SMS server can transmit an SMS message notifying the communication device 412 that the user session has expired. In the third stage 430, the SMS server transmits an SMS message 442 over the phone number 460 to the communication device 412 indicating that the user session has expired. Upon receipt, the user of the communication device 412 will be notified of the expired user session corresponding to the phone number 460. By way of example, the SMS message 442 can include alphanumerical message such as, "User session expired. Please transmit another SMS message to initiate another user session." One of ordinary skill in the art would appreciate that any suitable message could be included in the SMS message 442 for notifying the user. By reference to FIG. 3, the process 300 at 320 transmits the second SMS message over the first phone number indicating the expired user session.

The SMS server can release the phone number 460 for assigning to another user session. In some configurations, the SMS server can wait a second period of time before releasing the phone number currently in the stale status. As shown in the fourth stage 440, the SMS server changes the status of the phone number 460 to a free status from the stale status in the third stage 430. Referring to FIG. 3, the process 300 at 325 changes the status of the first phone number to the free status after the second period of time has elapsed.

Figure 5:
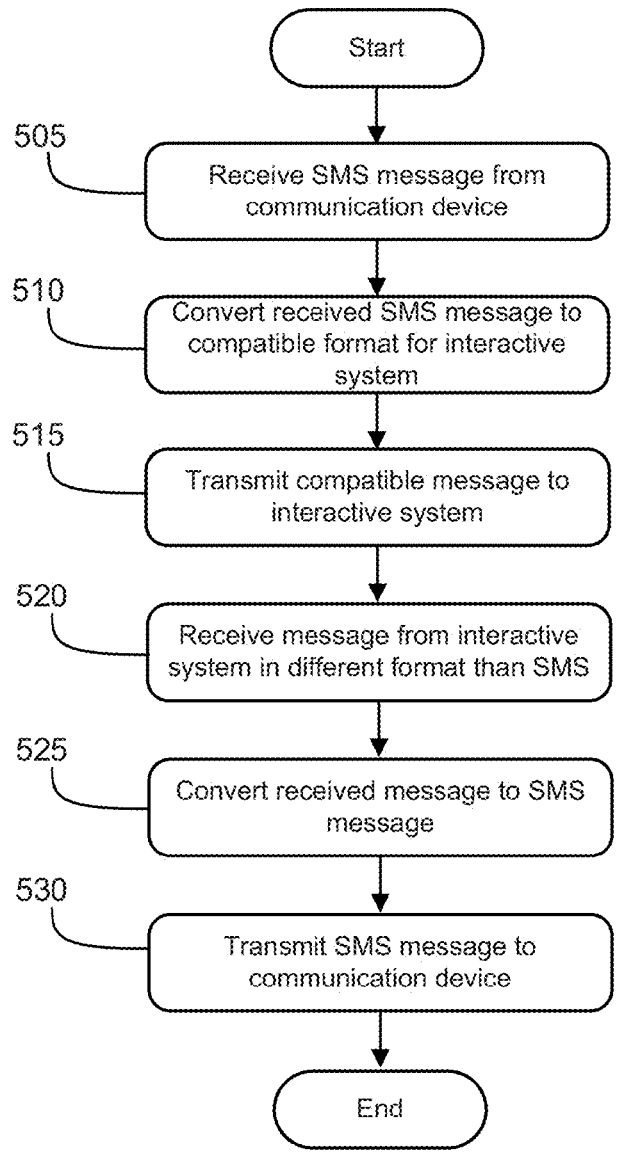
FIG. 5 conceptually illustrates an exemplary process for converting an SMS message to a compatible format for an interactive system.

The following discussion describes an exemplary process that can be implemented by an SMS server to convert SMS messages from a user (i.e., a communication device) and messages received from an interactive system to facilitate a message flow between the communication device and interactive system. FIG. 5 conceptually illustrates an exemplary process 500 for converting an SMS message to a compatible format for an interactive system. In particular, FIG. 5 illustrates a request-response communication flow in which the process 500 converts an incoming SMS message (e.g., from the communication device) for transmission to the interactive system, and converts an incoming message from the interactive system in response for transmission to the communication device. The process 500 of some configurations can be performed conjunctively with the processes 200 and/or 300 described above in FIGS. 2 and 3 for providing a reusable stream model for interacting with the interactive system.

The process 500 begins at 505 when an SMS message is received from a communication device. For example, the process 500 can receive the SMS message over a phone number (e.g., a first phone number) assigned to a user session or over a system number (i.e., #Sys) before a phone number is assigned to the user session. In some configurations, the SMS message can include a command to access a service provided by the interactive system or include a selected option from a level of the interactive system.

At 510, the process 500 converts the received SMS message to a compatible format for the interactive system. In particular, the interactive system may process data and/or messages in a different format that is incompatible with the SMS message format. The process 500 therefore converts the SMS message to enable the interactive system to process the included command or selected option from the SMS message. For example, the process 500 can convert the SMS message data into the compatible format by performing a data transformation. In some configurations, the process 500 can extract alphanumerical data corresponding to the command or selected option from the SMS message and subsequently include the extracted data in the compatible message. The process 500 at 515 then transmits the compatible message to the interactive system.

After executing an operation in response to the compatible message, the interactive system of some configurations can transmit a message to the SMS server in response. At 520, the process 500 receives a message in a different format than the SMS message format from the interactive system. The message from the interactive system can include the results of executing the selected option from a level in the interactive system or include a set of options from the level. The process 500 at 525 then converts the received message into the SMS message format for transmission to the communication device. At 530, the process 500 transmits the SMS message to the communication device. The process 500 then ends.

The above described operations in FIG. 5 illustrate an example of a single request response communication flow between the communication device and the interactive system for converting messages. However, one of ordinary skill in the art would understand that the process 500 could be repeatedly performed for more than one request-response communication flow. For example, in the reusable stream model, the SMS server can assign a second number to a second user session. It should be understood that the process 500 can then perform the operations in FIG. 5 for messages that are received and transmitted over the second number assigned to the second user session.

The following section describes an exemplary computing environment including an SMS server that can implement the above described processes as a computer program running on a particular machine, such as a computer, or stored as instructions in a computer readable medium.

Figure 6:
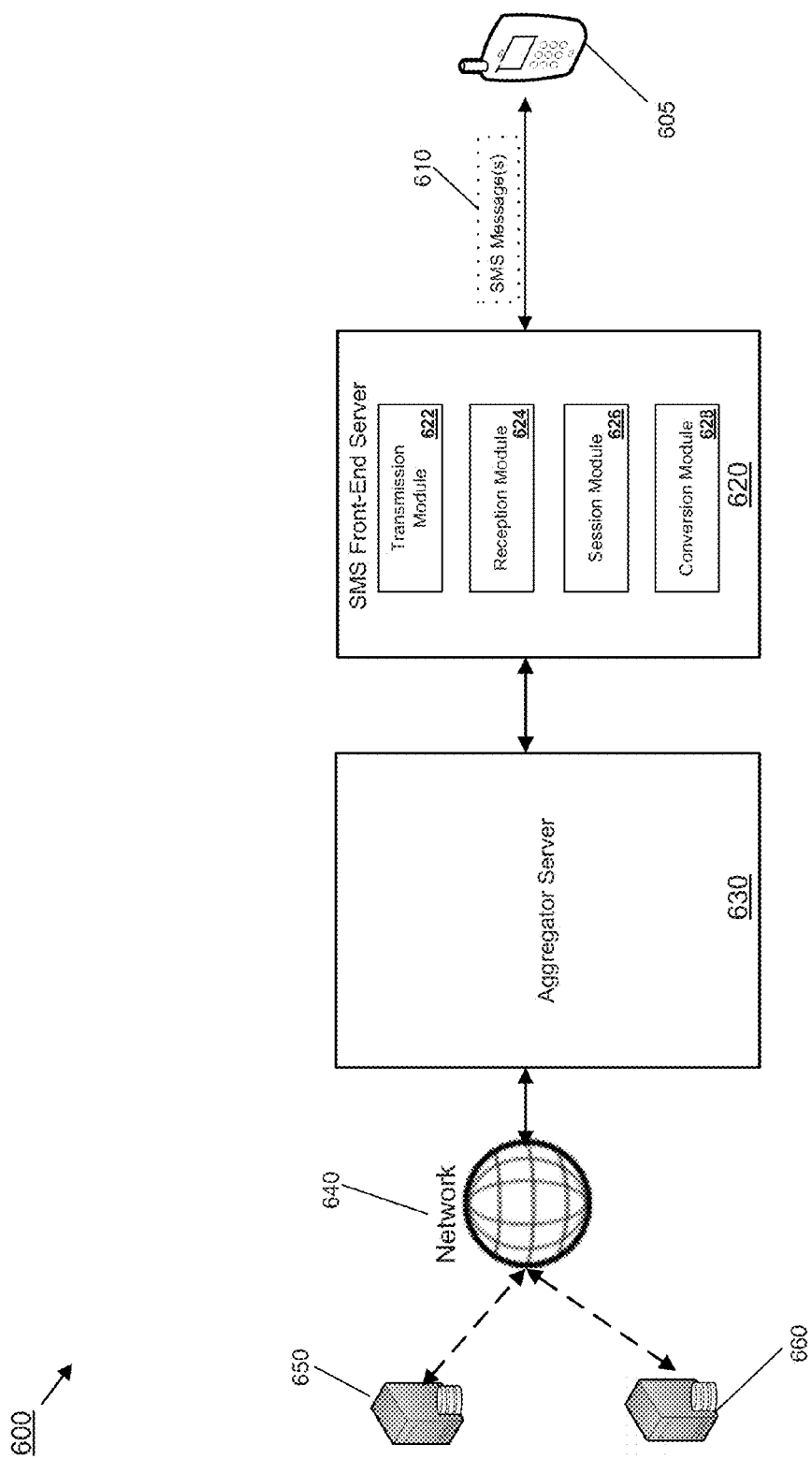
FIG. 6 conceptually illustrates an exemplary computing environment including an SMS server of some configurations.

FIG. 6 conceptually illustrates an exemplary computing environment 600 including an SMS server of some configurations. In particular, FIG. 6 shows an SMS front-end server 620 for implementing the above described processes in FIGS. 2 and 3 that manage a sequence of phone numbers for providing a user interface over SMS to an interactive service. In some configurations, the SMS front-end server 620 is part of a server-based implementation running a particular machine connected to a network.

The SMS front-end server 620 of some configurations includes different modules for providing different functionality. As illustrated in FIG. 6, the SMS front-end server 620 includes a transmission module 622 configured to transmit SMS messages, a reception module 624 configured to receive SMS messages, a session module 626 configured to manage a sequence of numbers, and a conversion module 628 configured to convert non-SMS messages to SMS messages and vice versa. To implement the reusable stream model, the SMS front-end server 620 includes the session module 626 that initially assigns an available first number (i.e., in a free status) from the sequence of numbers to a first user session (e.g., after the reception module 624 receives a first SMS message to initiate a user session from a communication device). For a subsequent SMS message that initiates another user session (e.g., second user session), the session module 626 of the SMS front-end server 620 can then assign a second available number (i.e., in a free status) from the sequence of numbers to the subsequent user session. The session module 626 of the SMS front-end server 620 is further configured to change the status of the first and second phone numbers to a busy status after the first and second phone numbers are assigned to respective user sessions. The session module 626 of the SMS front-end server 620 is configured to monitor activity over the first and second phone in order to determine whether the assigned user sessions are expired due to inactivity and can change the status of the first and second phone numbers to a state status in response. Further, the session module 626 of the SMS front-end server 620 is configured to release any phone numbers in a stale status to a free status to enable any such numbers to be assigned to subsequent user sessions.

As shown, the computer environment 600 includes a communication device 605, the SMS front-end server 620, an aggregator server 630, a network 640, and interactive service servers 650 and 660. The SMS front-end server 620 and the communication device 605 can engage in a two-way communication flow for providing a user interface to an interactive system over SMS as described above in FIGS. 1 and 4 and the processes in FIGS. 2 and 3. For instance, the reception module 624 of the SMS front-end server 620 can receive one or more SMS message(s) 610 that includes a selected option (e.g., from a level in the interactive service) or a command for executing by the interactive service from the communication device 605. Similarly, the transmission module 622 of the SMS front-end server 620 can also transmit one or more SMS message(s) 610 to the communication device 605 that includes a response to the selected option or command from the interactive service. The conversion module 628 of the SMS front-end server 620 can convert any received SMS message 610 to a compatible format for transmitting to the aggregator server 630.

The SMS front-end server 620 communicates with the aggregator server 630 to provide the user interface over SMS for one or more interactive service servers. In some configurations, the aggregator server could be located in the same location as the SMS front-end server 620 (e.g., local network) or over a remote network. The aggregator server 630 of some configurations provides an interface to one or more different interactive service servers that provide different interactive services such as e-mail, chat, social networking, blogging, etc. In particular, the aggregator server 630 can utilize an application programming interface (API) to access the interactive service servers 650 and 660 over the network 640, which can include, but is not limited to, a local network, remote network, or an interconnected network of networks (e.g., Internet). Based on the converted SMS message(s) from the SMS front-end server 620, the aggregator server 630 can access the interactive service servers 650 and 660 using one or more API calls to perform different operations. Although two different interactive service servers are illustrated in FIG. 6, one of ordinary skill in the art would realize that the aggregator server 630 could interface with any number of different interactive servers to access different services.

The interactive service servers 650 and 660 can process the API call(s) from the aggregator server 630 and transmit a response message(s) to the aggregator server 630. A response message can include the results of executing the selected option or command corresponding to a previously submitted SMS message from the communication device 605. After receiving the response message(s), the aggregator server 630 transmits the response message(s) to the SMS front-end server 620. In some configurations, the conversion module 628 of the SMS front-end server 620 can convert the received response message(s) into an SMS format for transmitting to the communication device 605. For example, the conversion module 628 of the SMS front-end server 620 can perform a data transformation operation involving one or more different steps to convert the received response message from a corresponding interactive service server into a SMS message format.

In the exemplary computing environment 600 illustrated in FIG. 6, the SMS front-end server 620 and the aggregator server 630 are shown as separate servers. Alternatively, the SMS front-end server 620 and the aggregator server 630 could be implemented as a single server with the combined functionality of the aforementioned servers as described above. For instance, the single server (e.g., with the functionality of the SMS front-end server and the aggregator server) could receive and transmit one or more SMS messages to the communication device 605 and manage the user session using the sequence of numbers (e.g., as described by reference to FIGS. 1-4). Additionally, the single server could convert SMS messages for transmitting to a corresponding interactive service server (e.g., interactive service servers 650 and 660). Conjunctively, the single server could receive one or more messages from the corresponding interactive service server and convert such messages into SMS format for transmission to the communication device 605.

Although FIG. 6 illustrates four exemplary modules 622-628 for performing different functionality for the SMS front-end server 620, one of ordinary skill in the art would recognize that other modules could be provided to perform other functionality for the SMS front-end server 620 and still be within the scope of the subject technology. Moreover, one of ordinary skill in the art would appreciate that, in some configurations, the functionality provided in one respective module could be combined into another module. For example, the functionality of the transmission and reception modules 622 and 624 could be combined into one module for the SMS front-end server 620.

The following section describes an exemplary system that implements aspects of the above described invention.

Many of the above-described features and applications are implemented as software processes that axe specified as a set of instructions recorded on a machine readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of machine readable media include, but are not limited to, CD-ROMs, flash drives, RAM chips, hard drives, EPROMs, etc. The machine readable media does not include carrier waves and electronic signals passing wirelessly or over wired connections.

In this specification, the term "software" is meant to include firmware residing in read-only memory and/or applications stored in magnetic storage, which can be read into memory for processing by a processor. Also, in some implementations, multiple software inventions can be implemented as sub-parts of a larger program while remaining distinct software inventions. In some implementations, multiple software inventions can also be implemented as separate programs. Finally, any combination of separate programs that together implement a software invention described here is within the scope of the invention, in some implementations, the software programs, when installed to operate on one or more systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Figure 7:
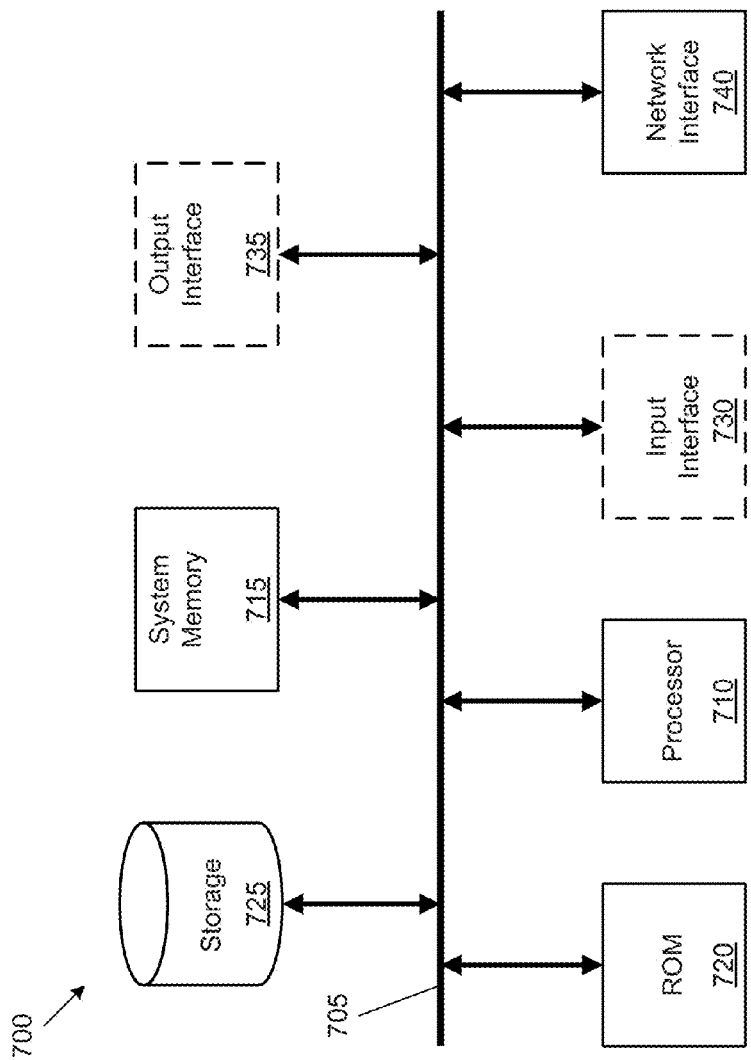
FIG. 7 conceptually illustrates a system with which some implementations of the subject technology may be implemented.

FIG. 7 conceptually illustrates a system 700 with which some implementations of the subject technology may be implemented. The system 700 can be a computer, phone, PDA, or any other sort of electronic device. Such a system includes various types of computer readable media and interfaces for various other types of computer readable media. The system 700 includes a bus 705, processing unit(s) 710, a system memory 715, a read-only memory 720, a storage device 725, an optional input interface 730, an optional output interface 735, and a network interface 740.

The bus 705 collectively represents all system, peripheral, and chipset buses that communicatively connect the numerous internal devices of the system 700. For instance, the bus 705 communicatively connects the processing unit(s) 710 with the read-only memory 720, the system memory 715, and the storage device 725.

From these various memory units, the processing unit(s) 710 retrieves instructions to execute and data to process in order to execute the processes of the invention. The processing unit(s) can be a single processor or a multi-core processor in different implementations.

The read-only-memory (ROM) 720 stores static data and instructions that are needed by the processing unit(s) 710 and other modules of the system 700. The storage device 725, on the other hand, is a read-and-write memory device. This device is a non-volatile memory unit that stores instructions and data even when the system 700 is off. Some implementations of the invention use a mass-storage device (such as a magnetic or optical disk and its corresponding disk drive as the storage device 725.

Other implementations use a removable storage device (such as a flash drive, a floppy disk, and its corresponding disk drive) as the storage device 725. Like the storage device 725, the system memory 715 is a read-and-write memory device. However, unlike storage device 725, the system memory 715 is a volatile read-and-write memory, such a random access memory. The system memory 715 stores some of the instructions and data that the processor needs at runtime. In some implementations, the invention's processes are stored in the system memory 715, the storage device 725, and/or the read-only memory 720. For example, the various memory units include instructions for processing multimedia items in accordance with some implementations. From these various memory units, the processing unit(s) 710 retrieves instructions to execute and data to process in order to execute the processes of some implementations.

The bus 705 also connects to the optional input and output interfaces 730 and 735. The optional input interface 730 enables the user to communicate information and select commands to the system. The optional input interface 730 can interface with alphanumeric keyboards and pointing devices (also called "cursor control devices"). The optional output interface 735 can provide display images generated by the system 700. The optional output interface 735 can interface with printers and display devices, such as cathode ray tubes (CRT) or liquid crystal displays (LCD). Some implementations can interface with devices such as a touchscreen that functions as both input and output devices.

Finally, as shown in FIG. 7, bus 705 also couples system 700 to a network interface 740 through a network adapter (not shown). In this manner, the computer can be a part of a network of computers (such as a local area network ("LAN"), a wide area network ("WAN"), or an Intranet, or an interconnected network of networks, such as the Internet. Any or all components of system 700 can be used in conjunction with the invention.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Configurations of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some configurations, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of exemplary approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the configurations described above should not be understood as requiring such separation in all configurations, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more," Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration," Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A machine-implemented method for releasing a phone number assigned to an active user session for an interactive system communicating over a Short Message Service (SMS), the method comprising:

for a first phone number assigned to a first user session, determining whether the first phone number is inactive during a first period of time;

changing the status of the first phone number from a busy status to a stale status if the first phone number is inactive during the first period of time;

changing the status of the first phone number from the stale status to a free status after a second period of time has elapsed;

after changing the status of the first phone number to the stale status, receiving a first SMS message over the first phone number from a communication device corresponding to the user session; and transmitting a second SMS message over the first phone number to the communication device, wherein the second SMS message includes data indicating that the first user session is expired.

2. The method of claim 1, wherein determining whether the first phone number is inactive during the first period of time comprises determining whether an SMS message is not transmitted or received over the first phone number during the first period of time.

3. A system for providing a user-interface over a Short Message Service (SMS) to enable functionality in an interactive system, the system comprising:

a session module configured to assign a first available number from a sequence of phone numbers to a first user session and to assign a second available number from the sequence of phone numbers to a second user session, wherein the session module is further configured to:

for the first available number from the sequence of phone numbers, determine whether the first available number is inactive during a first period of time;

change the status of the first available number from a busy status to a stale status if the first available number is inactive during the first period of time; and change the status of the first available number from the stale status to a free status after a second period of time has elapsed;

a reception module configured to receive one or more SMS messages from a communication device for interacting with the first and second user sessions, wherein the reception module is further configured to:

after changing the status of the first available number to the stale status, receive a first SMS message over the first available number from the communication device corresponding to the first user session; and a transmission module configured to transmit one or more SMS messages to the communication device responsive to the received SMS messages, wherein the transmission module is further configured to:

transmit a second SMS message over the first available number to the communication device, wherein the second SMS message includes data indicating that the user session is expired.

4. The system of claim 3, wherein the session module is further configured to change a status of the first and second available phone numbers to a busy status.

5. The system of claim 3, wherein the transmission module transmits the one or more SMS messages to the communication device over the first and second phone numbers assigned to the first and second user sessions.

6. The system of claim 3, further comprising:

an aggregator server configured to provide an interface to a plurality of services.

7. The system of claim 3, wherein determining whether the first available number is inactive during the first period of time comprises determining whether an SMS message is not transmitted or received over the first available number during the first period of time.

8. A non-transitory machine-readable medium comprising instructions stored therein, which when executed by a machine, cause the machine to perform operations comprising:

for a first phone number assigned to a first user session, determining whether the first phone number is inactive during a first period of time;

changing the status of the first phone number from a busy status to a stale status if the first phone number is inactive during the first period of time;

changing the status of the first phone number from the stale status to a free status after a second period of time has elapsed;

after changing the status of the first phone number to the stale status, receiving a first SMS message over the first hone number from a communication device corresponding to the user session; and transmitting a second SMS message over the first phone number to the communication device, wherein the second SMS message includes data indicating that the first user session is expired.

9. The non-transitory machine-readable medium of claim 8, wherein determining whether the first phone number is inactive during the first period of time comprises determining whether an SMS message is not transmitted or received over the first phone number during the first period of time.

10. The non-transitory machine-readable medium of claim 8, wherein the busy status indicates that a corresponding phone number is currently assigned to a user session.

11. The non-transitory machine-readable medium of claim 8, wherein the stale status indicates that a corresponding phone number is inactive.

* * * * *